Jan. 11, 1944.                W. H. HUTTER                 2,339,169
                                PROJECTOR
                            Filed Sept. 6, 1941          3 Sheets-Sheet 1

Inventor
William H. Hutter
BY
Sheridan, Davis & Cargill
Attys.

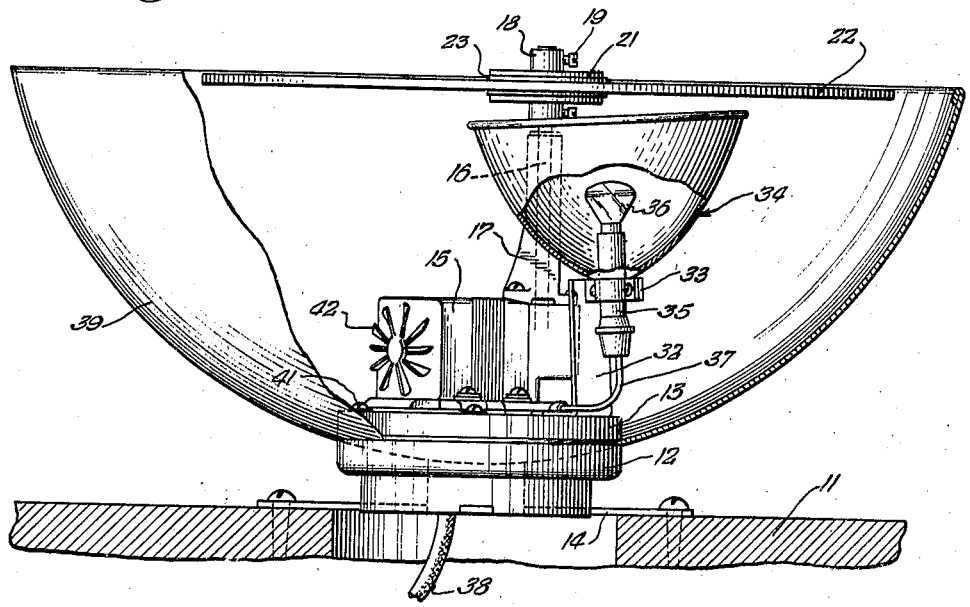
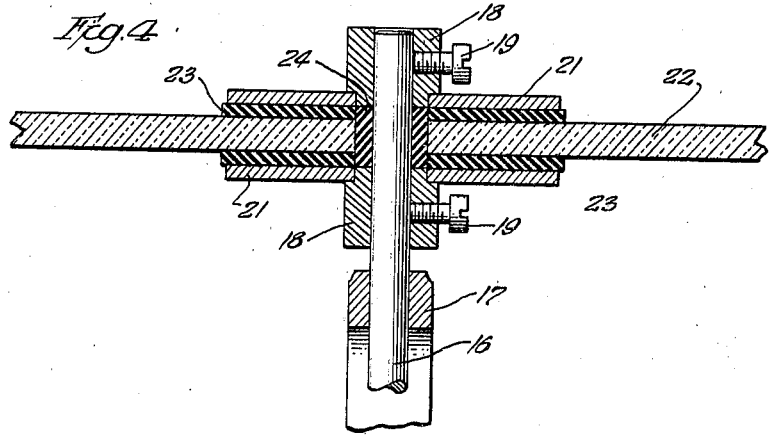

Jan. 11, 1944.   W. H. HUTTER   2,339,169
PROJECTOR
Filed Sept. 6, 1941   3 Sheets-Sheet 3

Inventor
William H. Hutter
BY
Sheridan, Davis & Cargill
Attys.

Patented Jan. 11, 1944

2,339,169

UNITED STATES PATENT OFFICE 2,339,169

PROJECTOR

William H. Hutter, Chicago, Ill., assignor to Rock-Ola Manufacturing Corporation, Chicago, Ill., a corporation of Delaware Application September 6, 1941, Serial No. 409,762

2 Claims. (Cl. 88—24)

This invention relates in general to projectors, and more particularly to a device for producing a constantly varying, multi-colored design on any desired surface.

A principal object of the invention is the provision of a device capable of projecting on some suitable surface, such as a ceiling or wall of a room, an interrelated and constantly changing multi-part design employing harmonizing colors, which is interesting, restful and pleasing to the eye.

Another important object of the invention is the provision of such a device which is of inexpensive construction, and the operating parts of which consist of a small motor for rotating a transparent colored pattern in the path of light projected from a low wattage light source by a reflector.

A further important object of the invention is the provision in such a device of means for obtaining different intensities of color in the different parts of the projected design from the same portion of the pattern being projected, while employing only a single light source.

Another important object of the invention is to obtain from any given portion or single part of the pattern being projected in such a device a plurality of different portions or parts of the projected design, which move on the design receiving surface relative to each other and some of which constantly change in size and shape.

A further object of the invention is the provision of such a projector which, while generating a minimum degree of heat in its operation, includes means for rapidly dissipating the heat that is generated, and means for insuring against energization of the light source unless the motor is operating to rotate the pattern disc.

Another object of the invention is the provision of an outer shield or casing for such a device which will conceal the operating parts thereof and presents a neat and unobtrusive appearance so as not to distract attention from the projected design.

Numerous other objects and advantages of the invention will be apparent as it is better understood from the following description, which, when taken in connection with the accompanying drawings, discloses a preferred embodiment thereof.

In the drawings:

Fig. 3 is a vertical sectional view taken substantially on the line 3—3 of Fig. 1;

Fig. 4 is a detail vertical section through the center of the pattern disc; and

Figure 1:
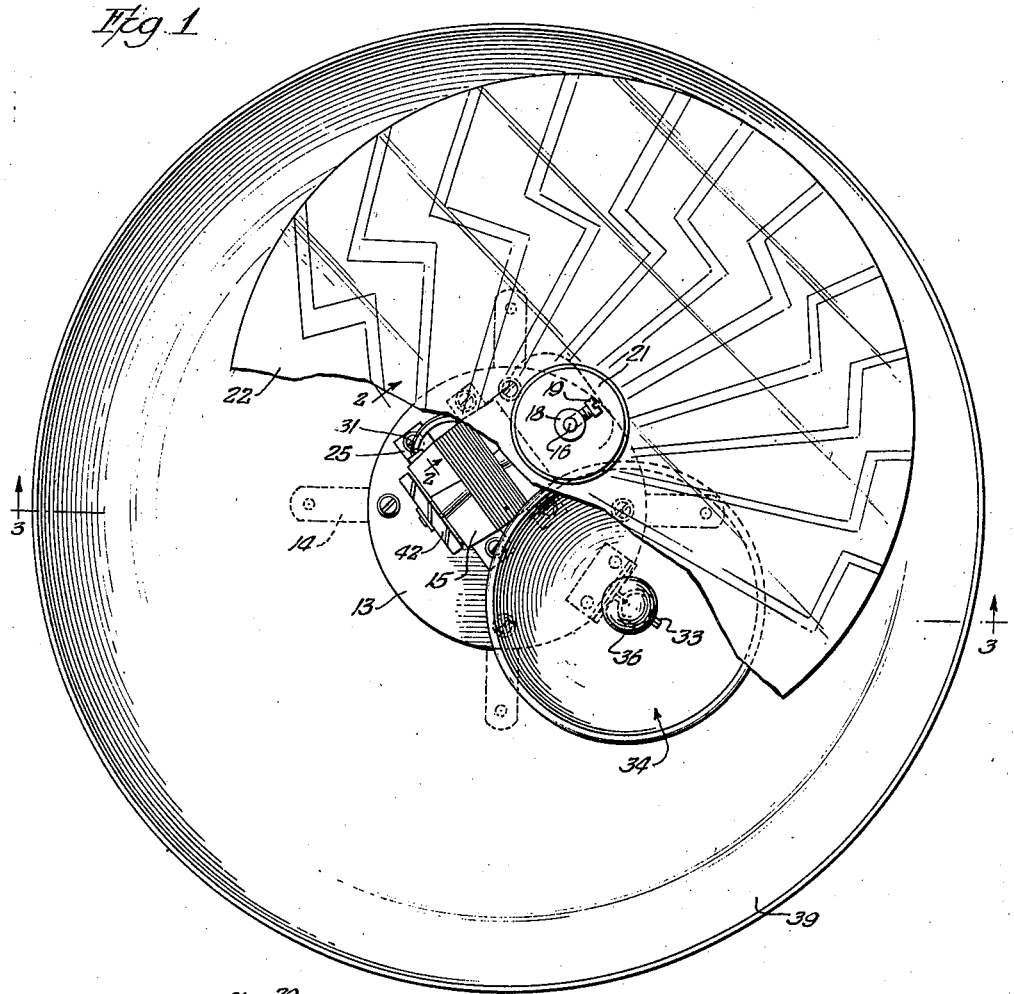
Figure 1 is a top plan view of a projector embodying the features of the invention, with part of the pattern disc broken away.

Referring more particularly to the drawings, reference numeral 11 indicates a supporting member of any suitable construction to which the lower part of a two part base member 12, 13 is secured by brackets 14 (Fig. 3). A motor 15 of any desired construction is mounted upon the upper surface of the top part 13 of the base member, and is provided with a vertically extending shaft 16 rotatably engaged adjacent its upper end by a bearing or guide bracket 17 (Fig. 4). Secured to the upper end of the shaft 16 are a pair of spaced retaining collars 18 which are adjustable longitudinally of the shaft and rigidly connected thereto by set screws 19. Engaging an inner shouldered portion of each of the retaining collars 18 is a disc or washer 21, between which a transparent pattern disc 22 is disposed. The pattern disc 22 is resiliently maintained on the shaft 16 by means of the retaining collars 18 and washers 21 and rubber or other suitable resilient gaskets 23 interposed between the discs 21 and 22. A resilient sleeve 24 of rubber or any other suitable material is mounted upon the shaft 16 between the retaining collars 18 so as to engage the side walls of a central aperture extending through the pattern disc 22. With this arrangement, the pattern disc 22, which is preferably made of glass, is rigidly secured in desired adjusted position upon the upper end of the shaft 16, while being cushioned relative thereto to prevent any damage to the disc or vibration thereof in its rotation by the shaft.

Figure 2:
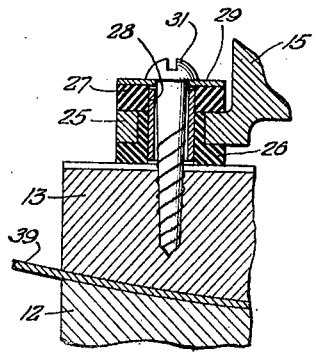
Fig. 2 is a detail vertical section taken substantially on the line 2—2 of Fig. 1.

In order to further prevent vibration of operating parts of the device, the casing of the motor 15 is mounted upon the upper base member 13 in the manner illustrated in Fig. 2. A plurality of apertured lugs or feet 25 extend laterally from the casing of the motor 15, each of which is engaged interiorly by and rests upon a flanged sleeve 26 of rubber or other suitable resilient material. A rubber washer 27 rests upon the upper surface of each of the lugs 25, and a metal sleeve 28 extends through the apertures in the sleeve 26 and the washer 27, but terminates short of the upper surface of the sleeve 26. A metal washer 29 rests upon the upper surface of each rubber washer 27, and a lag screw 31 contacts the upper surface thereof with its head portion, extends freely through the sleeve 28, and is screwed into the upper part 13 of the base member. With this arrangement, substantial relative movement between the feet 25 of the motor 15 and the base member 12, 13 is permitted without entailing any metal-to-metal contact between the several parts.

Also mounted upon the upper surface of the top part 13 of the base member 12, 13 is a bracket 32 to which a clamp 33 is adjustably secured in any suitable manner. The lower end of a reflector, indicated generally by reference numeral 34, and a lamp socket 35 (Fig. 3) are adjustably engaged and retained by the clamp 33. A light source comprising a low wattage bulb 36 is mounted in the upper end of the socket 35, and the leads 37 supplying electrical energy thereto are connected to the leads 38 of the motor 15. Energization of the lamp 36 is thus prevented unless current is also being supplied to the motor 15 to insure rotation of the pattern disc 22.

An outer casing 39 in the form of a semi-spherical shield extends at its central portion between the two parts 12 and 13 of the base member, and is secured thereto by screws 41 which extend through the upper part of the base member and the shield into the lower part to also secure the parts 12 and 13 together. The casing 39 encloses the several parts of the device, with the edge portion of its upper open end disposed slightly above the plane of the pattern disc 22. While the lamp 36 does not generate very much heat, and the electrical connections are such that it cannot be energized unless the motor 15 is also energized to rotate the pattern disc 22 to prevent undue heating of the latter, a fan 42 is mounted on the end of the shaft of the motor 15 opposite that connected to the shaft 16, for the purpose of circulating the air in the casing 39. Any possibility of damage to the transparent pattern disc 22 from the heat generated by the light source 36 is thus completely eliminated.

Figure 5:
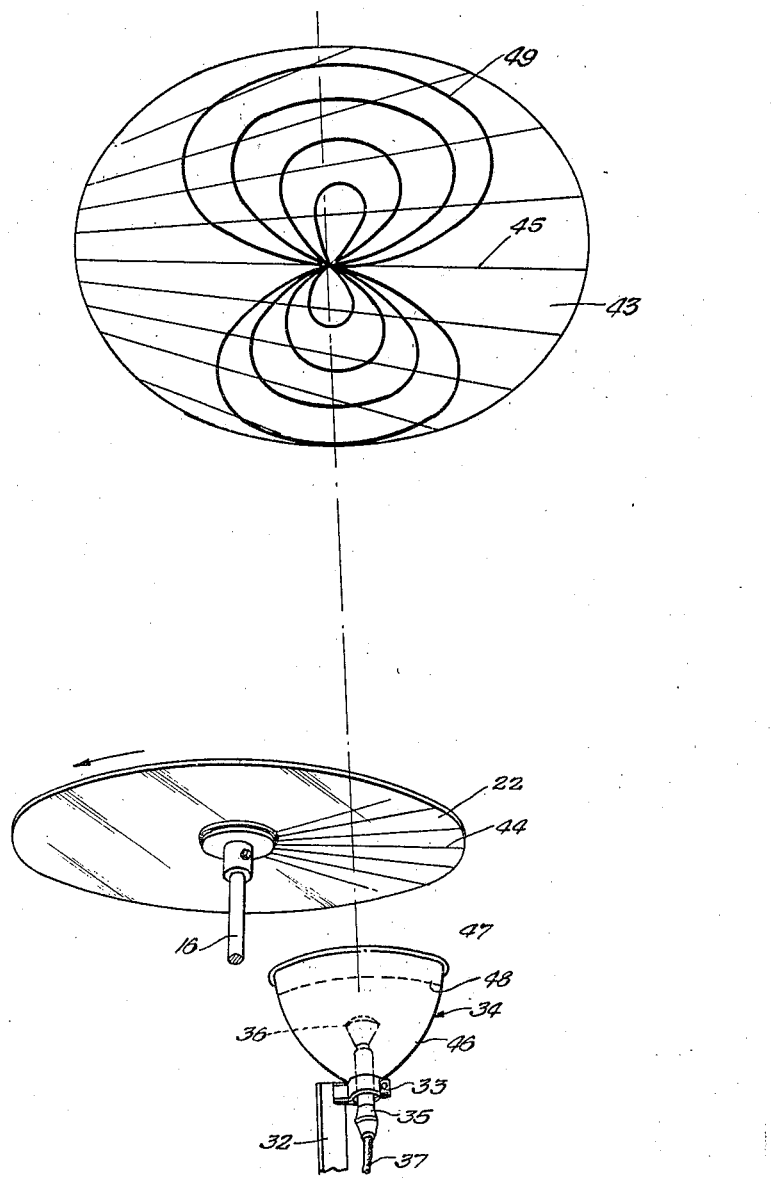
Fig. 5 is a perspective view illustrating the mode of operation of the instant device.

The above described device is adapted to project a constantly changing, multi-part design upon any suitable surface, such as a ceiling or wall of a room, as indicated at 43 in Fig. 5. In order to obtain the desired type of projected design, a pattern of any suitable configuration and employing different and harmonious colors is inscribed or painted upon the transparent disc 22. In Fig. 5, the pattern on the disc 22 is represented by a single radial line 44 for the purpose of simplifying the description of the operation of the device. The primary light emanating from the bulb or light source 36 will pass through the disc 22 to cast a true duplication of the pattern on the disc upon the receiving surface 43, as indicated by the line 45 in Fig. 5. As the disc 22 is rotated by the shaft 16 and the motor 15, this line 45 will traverse the image receiving surface 43.

The reflector 34 is formed in two parts which are integral with each other, the lower or main part 46 being in the form of a paraboloid, while the upper part 47 above the broken line 48 in Fig. 5, which comprises an invisible line of joinder between the two, is in the form of a truncated hollow cone. In other words, the outer portion 47 of the reflector 34 is linear and comprises a smooth continuation of the curved or parabolic main part 46. The light source or bulb 36 is disposed at a point spaced outwardly or upwardly from the focal point of the parabolic portion 46 of the reflector, so that light rays reflected by the latter will all be focused at a point in the plane of the pattern disc 22. Because of the parabolic form of the main portion 46 of the reflector 34, the reproduction of the pattern on the disc 22 which is thus projected upon the receiving surface 43 will have an entirely different configuration than that of the true pattern on the disc. If the pattern comprises the straight line 44, as shown in Fig. 5, the design reproduced on the receiving surface 43 by the light rays reflected by the parabolic portion 46 of the reflector will assume one of the curved shapes indicated by the reference numeral 49. Which one of these curved portions 49 of the projected design will be seen depends upon the relative position of the pattern line 44 on the disc 22 in relation to the reflector 34. In other words, as the disc 22 is rotated to carry the line 44 over the reflector 34, the parabolic portion 46 of the reflector will project a continuously changing curved design, as represented by the several lines 49, upon the receiving surface 43. The present arrangement thus results in the projection of a multi-part design from a single part pattern, wherein the one part of the projected design is a true duplication of the pattern, and the other part which is superposed thereon comprises a continually changing variation of the pattern. The linear portion 47 of the reflector 34 functions as a mask to prevent reflection of light from the bulb 36 beyond the desired confines of the portion of the pattern disc 22 directly above the reflector.

A different type of variation is also obtained with the instant mechanism by virtue of the construction and arrangement of the reflector 34. This variation is one of color intensity. The primary light emanating from the light source 36 will result in the true duplication of the pattern on the receiving surface 43 having a particular intensity of color. The intensity of color of this portion of the projected design, as represented by the lines 45 in Fig. 5, will be much less than that of the variable portion of the projected design, as represented by the curved lines 49, since the latter result from the light rays reflected by the parabolic portion 46 of the reflector, these all being focused in the plane of the pattern disc 22 to intensify the projected color. Consequently, the different parts of the multi-part design which is projected upon the receiving surface will have different intensities of color, while at the same time relative movement and variation between the different parts will also be obtained. The result will be an extremely interesting, restful and pleasing design obtained through the use of only a single low wattage light bulb. At the same time, the outer shield or casing 39 will conceal the operating parts of the projector, and present a neat and unobtrusive appearance which will not distract attention from the projected design.

From the above description, it will be readily apparent that the instant device is relatively inexpensive, and may be employed to project the constantly changing dsign upon any desired surface. The adjustability of the reflector 34 and light bulb 36 relative to the pattern disc 22 enables further variation of the projected design, and may also be employed to compensate for variations in the angular position of the receiving surface which may be encountered relative to the supporting structure 11.

It will also be apparent that further innumerable variations in the projected design may readily be obtained by employing more than the one pattern disc 22 illustrated herein. Different portions of such additional pattern discs may be superposed in the path of projected light, and/or they may be rotated at different speeds, and/or the reflector 34 and light source 36 may be adjusted relative thereto, and/or more than the one or different light sources may be used, if desired, to obtain almost infinite variations of the projected patterns and color modulation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A projector, comprising a base member, a motor mounted on said base member, a transparent disc mounted for rotation by said motor and having a colored pattern thereon, a reflector adjustably mounted on said base member with its open end spaced from and directed toward said transparent disc to one side of the center of rotation thereof, a light source adjustably disposed interiorly of said reflector, and a semispherical outer shield secured centrally to said base member and surrounding said motor and reflector with the marginal portion of the open end thereof extending slightly beyond the plane of said transparent disc.

2. A projector, compriisng a motor, a transparent disc mounted for rotation by said motor and having a colored pattern thereon, a low wattage light source for projecting light rays through said disc and connected to be energized only with said motor, an outer casing surrounding said motor and light source and having an open end extending slightly beyond the plane of said disc, and a fan in said casing connected to said motor to circulate the air in said casing.

WILLIAM H. HUTTER.